US012454878B1

(12) United States Patent
Fahmi et al.

(10) Patent No.: US 12,454,878 B1
(45) Date of Patent: Oct. 28, 2025

(54) SAND PREVENTION SYSTEM

(71) Applicant: SAUDI ARABIAN OIL COMPANY, Dhahran (SA)

(72) Inventors: Mohanad Fahmi, Al Khobar (SA); Ming Han, Dhahran (SA); Abdulkareem Alsofi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/651,324

(22) Filed: Apr. 30, 2024

(51) Int. Cl.
*E21B 43/08* (2006.01)
*B02C 4/02* (2006.01)
*E21B 47/13* (2012.01)

(52) U.S. Cl.
CPC ................ *E21B 43/08* (2013.01); *B02C 4/02* (2013.01); *E21B 47/13* (2020.05)

(58) Field of Classification Search
CPC .......... E21B 43/08; E21B 43/34; E21B 43/35; E21B 43/38
See application file for complete search history.

(56) References Cited

U.S. PATENT DOCUMENTS 4,750,564 A * 6/1988 Pettigrew ............ E21B 33/1293 166/134
5,351,894 A * 10/1994 Longhurst ............... B02C 21/00 241/23
8,291,972 B2 10/2012 Dusterhoft et al.
2003/0085038 A1* 5/2003 Restarick ................ E21B 43/12 166/278
2008/0296023 A1* 12/2008 Willauer .................. C08K 3/08 977/735
2009/0020637 A1* 1/2009 Raaz ......................... B02C 4/28 241/143
2010/0108572 A1* 5/2010 Cleminson ............. C10G 1/047 196/14.52
(Continued)

FOREIGN PATENT DOCUMENTS

CN 114809996 B 12/2022

OTHER PUBLICATIONS

Zhang, Yiqun et al., "A Solution to Sand Production from Natural Gas Hydrate Deposits with Radial Wells: Combined Gravel Packing and Sand Screen"; Journal of Marine Science and Engineering; vol. 10, Issue 1, Article 71; pp. 1-17; Jan. 2022 (17 pages).
(Continued)

*Primary Examiner* — George S Gray
(74) *Attorney, Agent, or Firm* — Osha Bergman Watanabe & Burton LLP

(57) ABSTRACT

A sand prevention system includes a housing having a conduit and a plurality of sand crushers coupled to the housing that prevent sand particles disposed within a fluid of a well having a diameter greater than a specified diameter from passing through the conduit of the housing of the sand prevention system. Each sand crusher includes a casing and a plurality of crushing elements encased within the casing that reduce the diameter of the sand particles. The sand prevention system further includes a sensor module, fixed within the housing, that includes a plurality of sensors that detect a presence of sand particles within the fluid and a transmitter that notifies a surface location of the well of the presence of the sand particles within the fluid.

20 Claims, 10 Drawing Sheets

(56) References Cited

U.S. PATENT DOCUMENTS

| | | | | |
|---|---|---|---|---|
| 2012/0104128 | A1* | 5/2012 | Bara | B01F 23/50 366/338 |
| 2013/0032352 | A1* | 2/2013 | Raglin | E21B 43/35 166/227 |
| 2015/0233215 | A1* | 8/2015 | Yeh | E21B 43/04 166/278 |
| 2019/0033898 | A1* | 1/2019 | Shah | G01N 29/4427 |
| 2022/0307363 | A1* | 9/2022 | Nagge | E21B 33/03 |
| 2022/0349292 | A1* | 11/2022 | Tang | E21B 41/0099 |
| 2023/0129272 | A1* | 4/2023 | Khaksar | E21B 43/35 166/278 |
| 2023/0349268 | A1* | 11/2023 | Song | E21B 43/08 |

OTHER PUBLICATIONS

Durrett, J. L. et al., "Seeking a Solution to Sand Control"; Journal of Petroleum Technology; vol. 29, Issue 12, Paper No. SPE-6210-PA; pp. 1664-1672; Dec. 1977 (9 pages).

Van Vliet, J.P.M. et al., "Horizontal Openhole Gravel Packs Boost Oil Production in Brunei"; Proceedings of the SPE Asia Pacific Improved Oil Recovery Conference; Paper No. SPE-72130-MS; pp. 1-7; Oct. 8, 2001 (7 pages).

Zhu, F. et al., "A peridynamic investigation on crushing of sand particles"; Geotechnique; vol. 69, Issue 6; pp. 526-540; Jun. 2019 (15 pages).

* cited by examiner

SAND PREVENTION SYSTEM

BACKGROUND

Hydrocarbon resources are typically located below the earth's surface in subterranean porous rock formations, often called reservoirs. These hydrocarbon bearing reservoirs can be found in depths of tens of thousands of feet below the surface. In order to extract the hydrocarbon fluids, also referred to as oil and/or gas, wells may be drilled to gain access to the reservoirs. Wells may be drilled vertically from the surface, deviated from vertical, or vertical to horizontal in order to most effectively and efficiently access the subsurface hydrocarbon reservoirs.

A step in the drilling operations, or well construction, involves casing the wellbore with one or more strings of tubulars that are cemented in place. Often, a production string is run into the inner most casing string to provide a conduit for the hydrocarbon fluids to migrate to the surface. The production string may include tubulars connected together and may be interspersed with various pieces of equipment such as artificial lift equipment, packers, etc.

When drilling a well, the well may extend through different types of poorly consolidated formations. Such formations may include, for example, high permeability formations containing sand and/or other fine solids. During the production phase, hydrocarbon fluids may carry sand from these poorly consolidated formations through the equipment of the well. Consequently, the production of sand may cause a number of problems, such as slowing hydrocarbon production rate, scaling downhole equipment, including pipelines and valves, and damaging surface facilities. Furthermore, the repair or replacement of such equipment may only be performed during production shutdowns, where it is generally undesirable to slow down producing assets.

SUMMARY

In one aspect, one or more embodiments relate to a sand prevention system including a housing having a conduit and a plurality of sand crushers coupled to the housing that prevent sand particles disposed within a fluid of a well having a diameter greater than a specified diameter from passing through the conduit of the housing of the sand prevention system. Each sand crusher includes a casing and a plurality of crushing elements encased within the casing that reduce the diameter of the sand particles. The sand prevention system further includes a sensor module, fixed within the housing, that includes a plurality of sensors that detect a presence of sand particles within the fluid and a transmitter that notifies a surface location of the well of the presence of the sand particles within the fluid.

In one aspect, one or more embodiments relate to a method for installing a housing of a sand prevention system within a well, guiding a fluid through a conduit of the housing, and detecting, by a plurality of sensors of a sensor module, a presence of sand particles within the fluid. The method further includes notifying, by a transmitter of the sensor module, the presence of sand particles to a surface location of the well, and preventing sand particles disposed within the fluid having a diameter greater than a specified diameter from passing through the conduit of the housing with by a plurality of sand crushers. Each sand crusher includes a casing and a plurality of crushing elements. Further, the method includes reducing, by the plurality of crushing elements of each sand crusher, the diameter of the sand particles to a size less than the specified diameter.

Other aspects of the present invention will be apparent from the following description and claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility.

DETAILED DESCRIPTION

Specific embodiments of the disclosure will now be described in detail with reference to the accompanying figures. In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not intended to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In addition, throughout the application, the terms "upper" and "lower" may be used to describe the position of an element in a well. In this respect, the term "upper" denotes an element disposed closer to the surface of the earth than a corresponding "lower" element when in a downhole position, while the term "lower" conversely describes an element disposed further away from the surface of the well than a corresponding "upper" element. Likewise, the term "axial" refers to an orientation substantially parallel to the well, while the term "radial" refers to an orientation orthogonal to the well.

This disclosure describes systems and methods of reducing the size of sand and/or other solid particles and preventing damage to production and surface equipment of a well. The techniques discussed in this disclosure are beneficial in reducing the total time of repairing and/or replacing damaged equipment and, thus, reducing associated costs. In addition, the systems discussed in this disclosure are beneficial as they may be installed permanently within the well.

Figure 1:
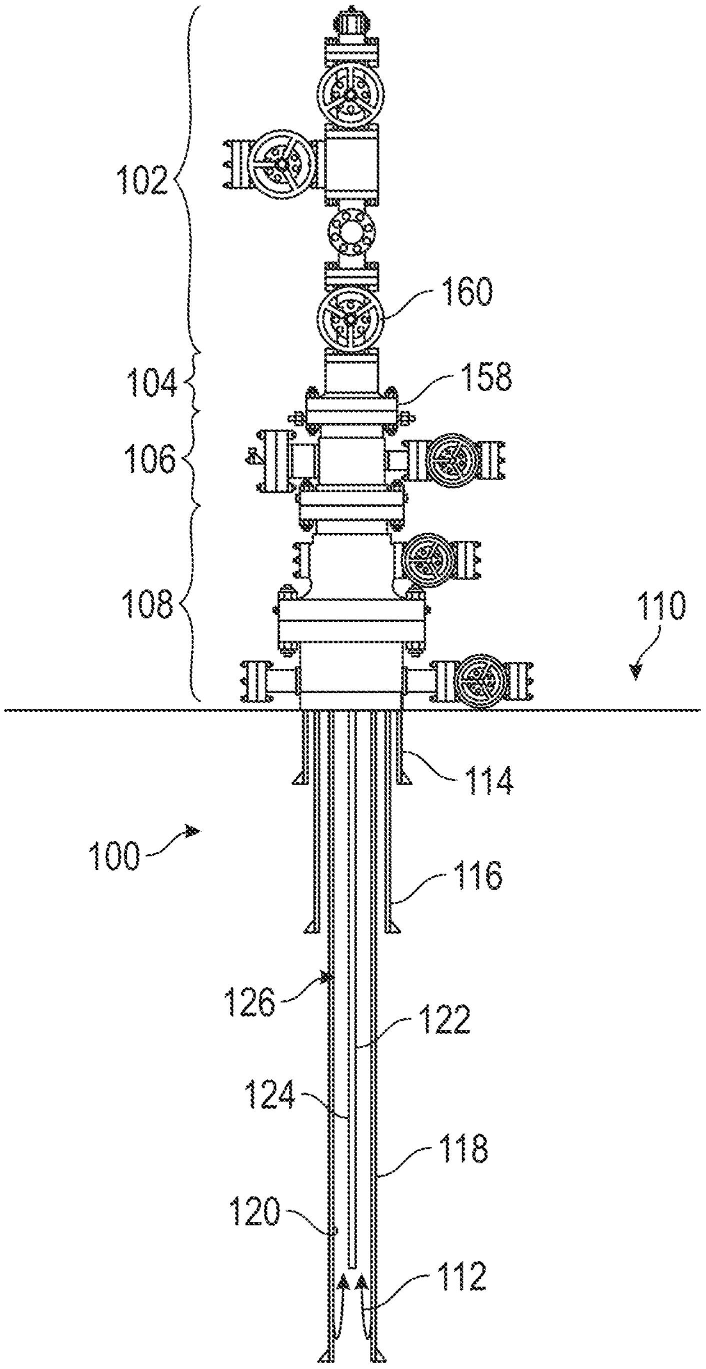
FIG. 1 shows an exemplary well site in accordance with one or more embodiments.

FIG. 1 shows an exemplary well 100 in accordance with one or more embodiments. In general, well(s) 100 may be configured in several different ways. Therefore, the illustrated well 100 of FIG. 1 is not intended to be limiting with respect to the particular configuration of the production and surface equipment. The well 100 is depicted as being on land. In other examples, the well 100 may be located offshore. In the non-limiting example of FIG. 1, the well 100 includes a production tree 102, a tubing bonnet 104, a tubing head 106, and a casing head 108 located on a surface location 110. The surface location 110 is any location outside of the well 100, such as the Earth's surface. The production tree 102 has a plurality of valves that control the production of production fluids 112 that come from a production zone located beneath the surface location 110. The valves also allow for access to the subsurface portion of the well 100.

The well 100 has three strings of casing: conductor casing 114, surface casing 116, and production casing 118. The casing strings are made of a plurality of long high-diameter tubulars threaded together. The tubulars may be made out of any durable material known in the art, such as steel. The casing strings are cemented in place within the well 100. The casing strings may be fully or partially cemented in place without departing from the scope of the disclosure herein.

Each string of casing, starting with the conductor casing 114 and ending with the production casing 118, has a smaller outer diameter and inner diameter than the previous casing such that the surface casing 116 is nested within the conductor casing 114 and the production casing 118 is nested within the surface casing 116. Upon completion of the well 100, the inner circumferential surface 120 of the production casing 118 and the space located within the production casing 118, make up the interior of the well 100.

The majority of the length of the conductor casing 114, surface casing 116, and production casing 118 are located underground. However, the surface-extending portion of each casing string is housed in the casing head 108, also known as a wellhead, located at the surface location 110. The surface-extending portion of each casing string may include a casing hanger (not pictured) that is specially machined to be set and hung within the casing head 108. There may be multiple casing heads 108 depending on the number of casing strings without departing from the scope of the disclosure herein.

Production tubing 122 is deployed within the production casing 118. The production tubing 122 may include a plurality of tubulars connected together and may be interspersed with various pieces of equipment such as artificial lift equipment, packers (e.g., FIG. 2), etc. The space formed between the outer circumferential surface 124 of the production tubing 122 and the inner circumferential surface 120 of the production casing 118 is called the tubing-casing annulus 126.

The majority of the length of the production tubing 122 is located in the interior of the well 100 underground. However, the surface-extending portion of the production tubing 122 is housed in the tubing head 106 which is installed on top of the casing head 108. The surface-extending portion of the production tubing 122 may include a tubing hanger (not pictured) that is specially machined to be set and hung within the tubing head 106. The production tree 102 is connected to the top of the tubing head 106 using the tubing bonnet 104. The tubing bonnet 104 is an adapter comprising one or more seals (not pictured).

In accordance with one or more embodiments, the production casing 118 may comprise a portion made of slotted casing or screen such that production fluids 112 may flow into the production casing 118 from the formation. In other embodiments, the production casing 118 may include perforations made through the production casing 118, cement, and wellbore in order to provide a pathway for the production fluids 112 to flow from the production zone into the interior of the well 100. The production fluids 112 may travel from the interior of the well 100 to the surface location 110 through the production tubing 122. A pipeline (not pictured) may be connected to the production tree 102 to transport the production fluids 112 away from the well 100.

While production fluids 112 travel to the surface location 110 during the production phase, sand and/or other solids entrained within the production fluids 112 may pass through the production and surface equipment of the well 100. This commonality is frequently referred to as "sand production." Sand production is considered a significant production issue that may considerably reduce well 100 productivity and may lead to a well 100 collapsing or being abandoned. For example, when extracting production fluids 112 from wells 100 that contain sand production, damage may be caused to the casing head 108, elbows (not shown), chokes (not shown), pipelines, and other control equipment by erosion. In turn, this damage may lead to several flow assurance issues.

Current common practices to minimize sand production, such as adjusting the choke, may limit the production capabilities of the well 100 and do not resolve the issue at hand but merely reduce the probability of damage. Further, sand screens (e.g., FIG. 2) are commonly employed within wells 100 that are frequent to sand production. However, because sand screens may be made of glass, they need to be maintained regularly due to their sensitivity. Also, when large grains are introduced to the screening flats of the sand screen, it causes blockage within the production tubing 122 and, thus, causes a problem to the flow of the well 100. Consequently, screen plugging may result in productivity decline and creation of localized areas of high-velocity flow (production hot spots) in non-plugged parts of the sand screen.

Accordingly, because sand screens alone may create their own production inefficiencies as stated above, there is a need for a sand prevention system (e.g., FIG. 2) that can successfully reduce the negative effect that sand particles (e.g., FIGS. 5A-5C) have on the equipment of a well 100. As such, embodiments disclosed herein present systems and methods for a sand prevention system employed within a well 100 to prevent sand and/or other solid particles from colliding into and causing damage to production and surface equipment of the well 100.

Figure 2:
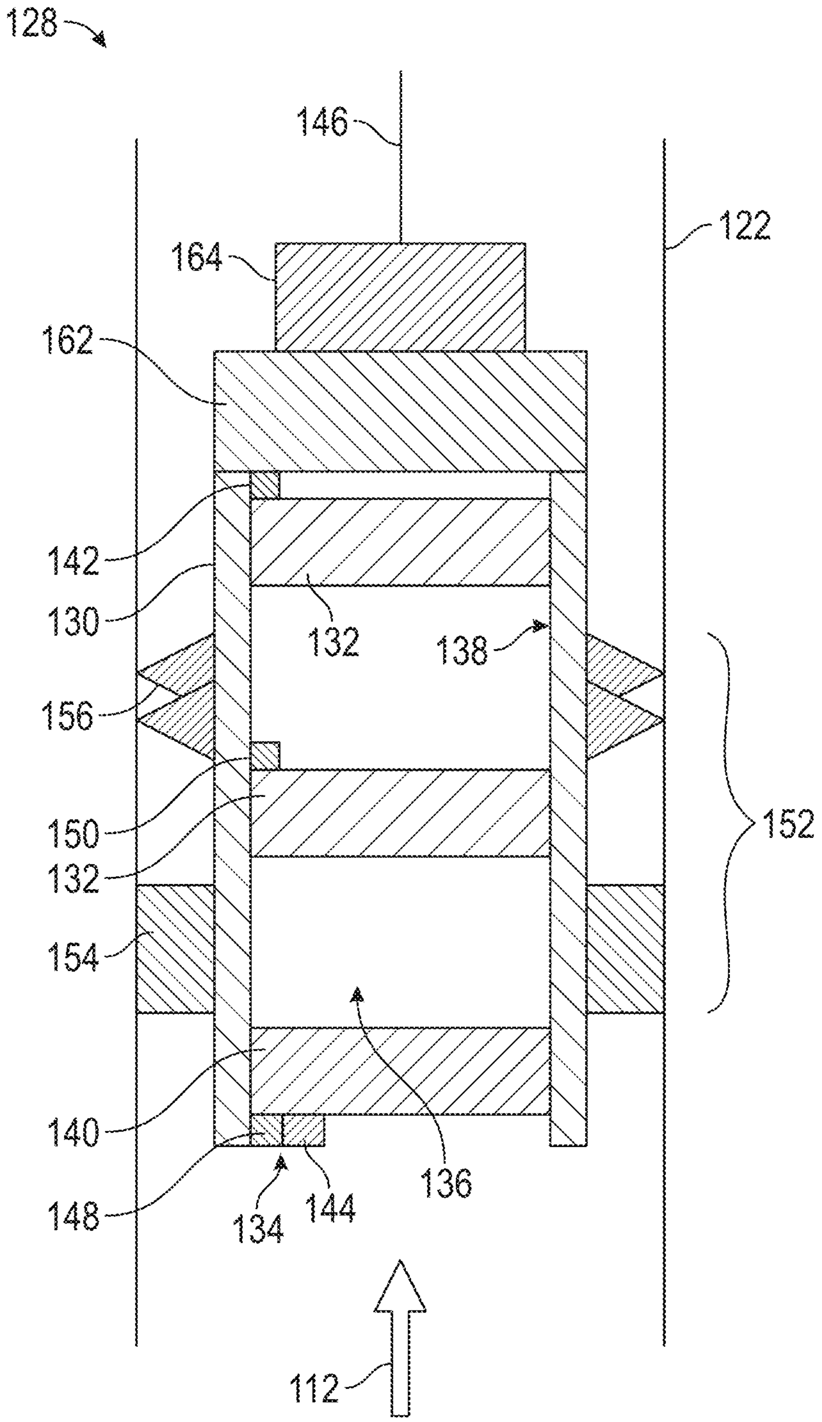
FIG. 2 shows a cross-sectional view of a sand prevention system in accordance with one or more embodiments of the present disclosure.

FIG. 2 shows a cross-sectional view of a sand prevention system 128 in accordance with one or more embodiments of the present disclosure. Here, the sand prevention system 128 is disposed within the production tubing 122 of the well 100. The sand prevention system 128 includes a housing 130, a plurality of sand crushers 132, and a sensor module 134. The housing 130 of the sand prevention system 128 may be tubular shaped and formed of a durable material such as steel. In addition, the housing 130 includes a conduit 136 that is a bore of the housing 130 which extends axially for the length of the housing 130. The plurality of sand crushers 132 and the sensor module 134 are fixed to an interior wall 138 of the housing 130 within the conduit 136 of the housing 130.

In the non-limiting example of FIG. 2, two sand crushers 132 are coupled to the interior wall 138 of the housing 130. Each sand crusher 132 is designed to prevent sand particles (e.g., FIGS. 5A-5C) and/or other solid particles disposed within a fluid 112 of the well 100 that include a diameter greater than a specified diameter from passing through the conduit 136 of the housing 130. Accordingly, each sand crusher 132 includes a plurality of crushing elements (e.g., FIG. 4) that serve to reduce the diameter of the sand particles. The structures and functions of both the sand crushers 132 and the plurality of crushing elements are further discussed with reference to FIG. 4.

In one or more embodiments, the sand prevention system 128 may include one or more sand screens 140. In FIG. 2, a sand screen 140 is coupled to the interior wall 138 of the housing 130 near a downhole end, or entrance, of the conduit 136. In this way, the sand screen 140 acts as a first line of defense, filtering sand particles or other solids with a diameter greater than a specified diameter.

The sensor module 134 of the sand prevention system 128 may include a plurality of sensors 142, instrumentation, and signal processing elements, such as circuits, transmitters 144, receivers, connecting probes, and data storing and processing devices. As such, the sensor module 134 detects the presence of sand particles within the fluid 112 passing through the sand prevention system 128 by the plurality of sensors 142. In addition, the sensor module 134 sends a signal to the surface location 110 upon the detection of sand particles within the fluid 112 via the transmitter 144. Further, the plurality of sensors 142 of the sensor module 134 may collect data regarding the sand particles and the sand prevention system 128. The data collected by the sensor module 134 may include the presence of sand particles within the fluid 112, the amount and size of sand particles that have entered the conduit 136 of the housing 130, the amount and size of sand particles that have exited the conduit 136 of the housing 130, and/or the amount/percentage of sand particles that have been crushed by the sand crushers 132 of the sand prevention system 128. Accordingly, the sensor module 134 may process the data collected by the plurality of sensors 142 and transmit the data to the surface location 110. Alternatively, the data may be processed by processing devices (not shown) disposed at the surface location 110. The data may be sent to the surface location 110 by the transmitter 144 wirelessly. In one or more embodiments, the sensor module 134 may be in electric communication with an electric cable 146 that is connected to the sand prevention system 128 and extends to the surface location 110. In this way, the sensor module 134 may transmit data to the surface location 110 via the electric cable 146.

As shown in FIG. 2, the sensor module 134 is disposed along the interior wall 138 of the housing 130. In particular, a first sensor 148 and a transmitter 144 of the sensor module 134 is disposed along the interior wall 138 of the housing 130 at the downhole end of the conduit 136. In addition, a second sensor 150 is disposed along the interior wall 138 of the housing 130 uphole of a downhole sand crusher 132 of the two sand crushers 132. As such, the plurality of sensors 142 may be positioned along the interior wall 138 of the housing 130 before and/or after each sand crusher 132 within the housing 130. The plurality of sensors 142 may be coupled, wireless or wired, to the transmitter 144. Further, the plurality of sensors 142 of the sensor module 134 may be a form of electrical resistance sensors.

The sand prevention system 128 may further include a locking unit 152. In one or more embodiments, the locking unit 152 of the sand prevention system 128 may be in the form of a packer 154 and/or slips 156. In the non-limiting example of FIG. 2, the locking unit 152 is coupled to the exterior surface of the housing 130. The packer 154 and slips 156 are employed to isolate and anchor the sand prevention system 128, respectively, in place within the production tubing 122 prior to fluid 112 entering the conduit 136 of the housing 130. The packer 154 may be any packer 154 known in the art such as a mechanical packer. Further, upon setting (actuation), the packer 154 seals a space located between the sand prevention system 128 and the production tubing 122. In this way, fluid 112 is prevented from migrating around the sand prevention system 128 in the production tubing 122 subsequent to the packer 154 being set. Additionally, the slips 156 may be a set of tapered elements that are forced outwardly from the housing 130 against the production tubing 122. In one or more embodiments, the slips 156 may be forced against the production tubing 122 by a battery powered mechanism or by a set of pre-pressurized pistons. The release of the pre-pressurized pistons may be electronically powered by a battery. As such, when the slips 156 are pressed against the production tubing 122, the tapered elements provide upward and downward forces upon the sand prevention system 128, thereby fixing the position of the sand prevention system 128 within the production tubing 122. Although the slips 156 illustrated in FIG. 2 are shown as generally triangular elements, one of ordinary skill in the art will appreciate that the size, shape, and configuration of the slips are not so limited and that any slips known in the art may be used in combination with the sand prevention system 128 disclosed herein.

In one or more embodiments, the locking unit 152 may be a threaded connection (not shown) disposed along an uphole end of the housing 130. The threaded connection may be disposed on an interior or exterior surface of the housing 130 and connect to a complementary threaded connection (not shown) of a tubular of the production tubing 122. In this way, the sand prevention system 128 may be threadedly secured to a downhole end of a tubular of the production tubing 122.

In one or more embodiments, the sand prevention system 128 may be disposed at the surface location 110 between the production tree 102 and the casing head 108. In this case, the locking unit 152 may be threaded connections (not shown) disposed along the uphole and downhole ends of the housing 130. The threaded connections may be disposed on an interior or exterior surface of the housing 130 and connect to complementary threaded connections (not shown) of the production tree 102, tubing bonnet 104, tubing head 106, and/or casing head 108.

Alternatively, the locking unit 152 may be steel flanges (not shown) extending radially with respect to an axis of the housing 130 from the uphole and downhole ends of the housing 130. As such, the flanges are complementary to complementary flanges 158 (e.g., FIG. 1) of the surface equipment of the well 100. Further, the locking unit 152 may further include bolts (not shown) to secure the flanges to complementary flanges 158 of the production tree 102, tubing bonnet 104, tubing head 106, and/or casing head 108. In any case, the sand prevention system 128 is disposed downhole from a master valve 160 (e.g., FIG. 1) of the well 100.

Figure 3:
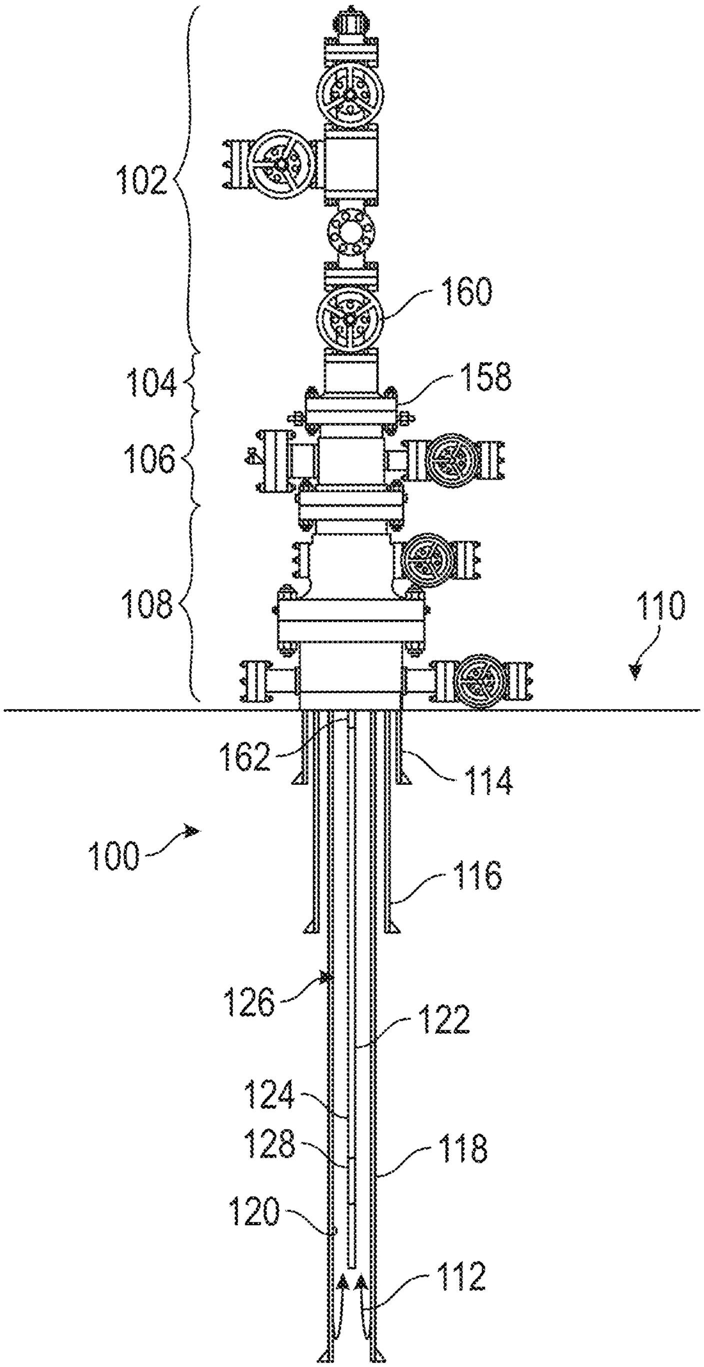
FIG. 3 shows an exemplary well site that includes a sand prevention system in accordance with one or more embodiments.

Furthermore, the sand prevention system 128 may include a pump 162 and a motor 164. In one or more embodiments, the pump 162 and the motor 164 may be disposed a distance above the housing 130 of the sand prevention system 128, closer to the surface location 110, as seen in FIG. 3. Alternatively, as seen in FIG. 2, the pump 162 is connected to the uphole end of the housing 130 of the sand prevention system 128. When activated, the pump 162 forces fluid 112 in the production tubing 122 downhole of the sand prevention system 128 to travel uphole and through the conduit 136 of the housing 130. The fluid 112 passes through the sand crushers 132 and the sand screen(s) 140 of the sand prevention system 128. Subsequently, the pump 162 receives the fluid 112 through a pump intake (not shown) and vents the fluid 112 through a pump discharge (not shown) into the production tubing 122 above the sand prevention system 128, such that the fluid 112 travels uphole to the surface location 110.

The pump 162 has a plurality of stages that are stacked upon one another. Each stage contains a rotating impeller (not shown) and stationary diffuser (not shown). As the fluid 112 enters each stage, the fluid 112 passes through the rotating impeller to be centrifuged radially outward, gaining energy in the form of velocity. The fluid 112 enters the diffuser, and the velocity is converted into pressure. As the fluid 112 passes through each stage, the pressure continually increases until the fluid 112 obtains the designated discharge pressure and has sufficient energy to flow to the surface location 110.

The motor 164 is a downhole submersible motor 164 that provides power to the pump 162. The motor 164 may be a two-pole, three-phase, squirrel-cage induction electric motor and may be connected to an uphole end of the pump 162. The operating voltages, currents, and horsepower ratings of the motor 164 may change depending on the requirements of the operation. Further, the size of the motor 164 is dictated by the amount of power that the pump 162 requires to lift an estimated volume of fluid 112 from the bottom of the well 100 to the surface location 110.

The motor 164 is powered by the electrical cable 146 which transfers energy from the surface equipment to the motor 164. Further, the electrical cable 146 is an electrically conductive cable that is capable of transferring information. Accordingly, the electrical cable 146 may also provide power to the sensor module 134 and transfer data between the sensor module 134 and the surface location 110. The electrical cable 146 may be a three-phase electric cable that is specially designed for downhole environments.

FIG. 3 shows an exemplary well 100 site that includes a sand prevention system 128 in accordance with one or more embodiments. Components shown in FIG. 3 that are the same as or similar to components shown in FIGS. 1 and 2 have not be re-described for purposes of readability and have the same description and function as outlined above. Here, the housing 130 is disposed within the downhole end of the production tubing 122. However, the housing 130 of the sand prevention system 128 may be positioned at any point in the production tubing 122 or at the surface location 110 between the production tree 102 and casing head 108. In accordance with one or more embodiments, the pump 162 of the sand prevention system 128 is disposed a distance uphole of the housing 130 of the sand prevention system 128.

The housing 130 of the sand prevention system 128 may be deployed downhole within the production tubing 122 by rigless intervention. That is, the housing 130 of the sand prevention system 128 may be deployed downhole within the production tubing 122 by a wireline, slick-line, or coiled tubing. In FIG. 2, the housing 130 is secured to the production tubing 122 by a locking unit 152 formed of a packer 154 and slips 156. Alternatively, the locking unit 152 may be a set of locking dogs (not shown) coupled to the exterior of the housing 130. In such cases, the production tubing 122 may include seating nipples (not shown) at the desired setting depth of the housing 130. Accordingly, when the housing 130 has reached the desired setting depth, the locks of the locking dogs will actuate, land, and lock within the corresponding seating nipples of the production tubing 122.

Figure 4:
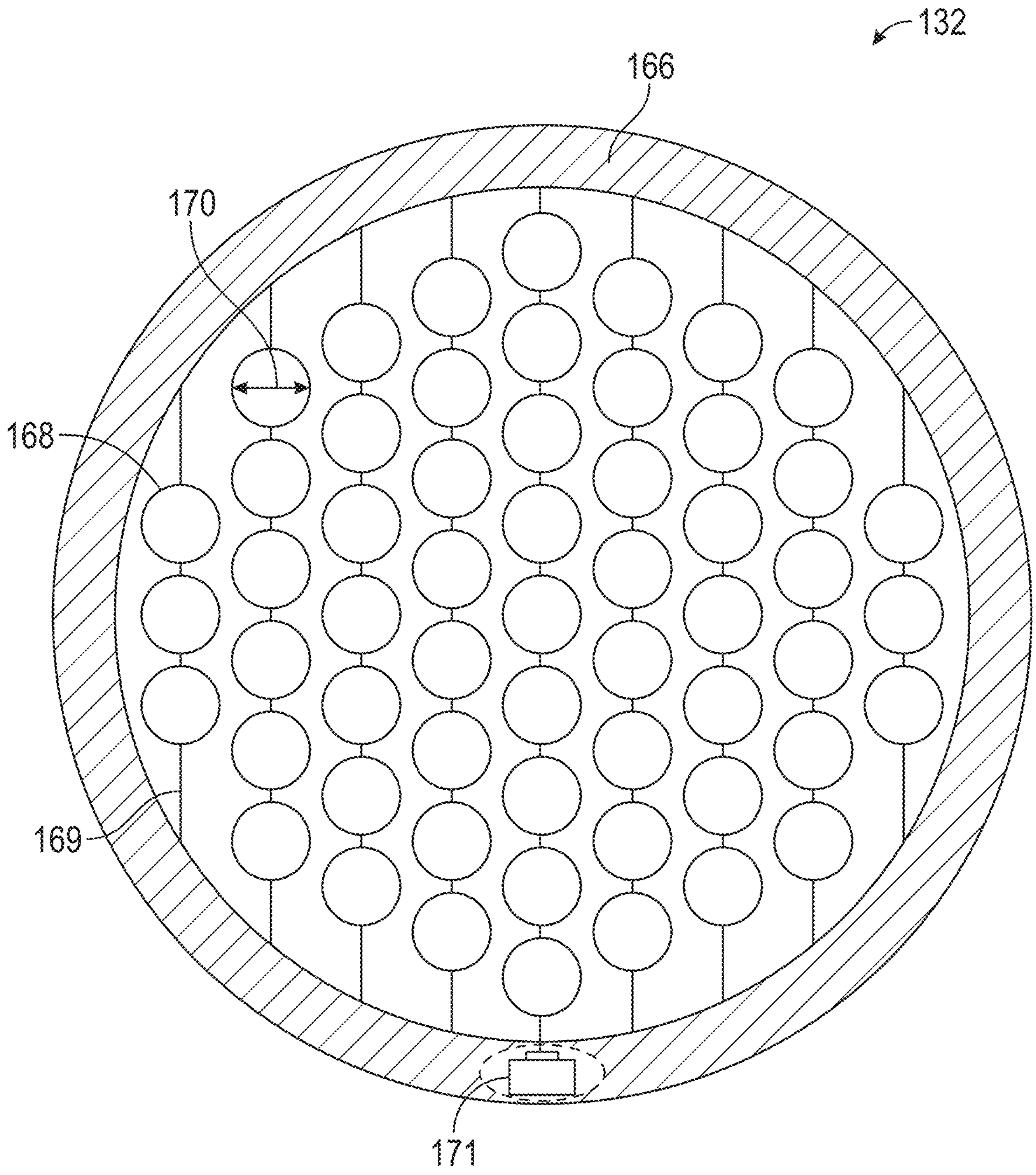
FIG. 4 shows a cross-sectional view of a sand crusher in accordance with one or more embodiments of the present disclosure.

FIG. 4 depicts a cross-sectional view of a sand crusher 132 in accordance with one or more embodiments of the present disclosure. The sand crusher 132 includes a casing 166 and a plurality of crushing elements 168. The casing 166 of the sand crusher 132 is generally tubular shaped and has an outer diameter similar to the inner diameter of the conduit 136 of the housing 130. The casing 166 may be formed of a durable material similar to the housing 130 and the production tubing 122, such as steel. Further, the casing 166 of each sand crusher 132 may be welded, glued, or bolted to the interior wall 138 of the housing 130.

Figure 10:
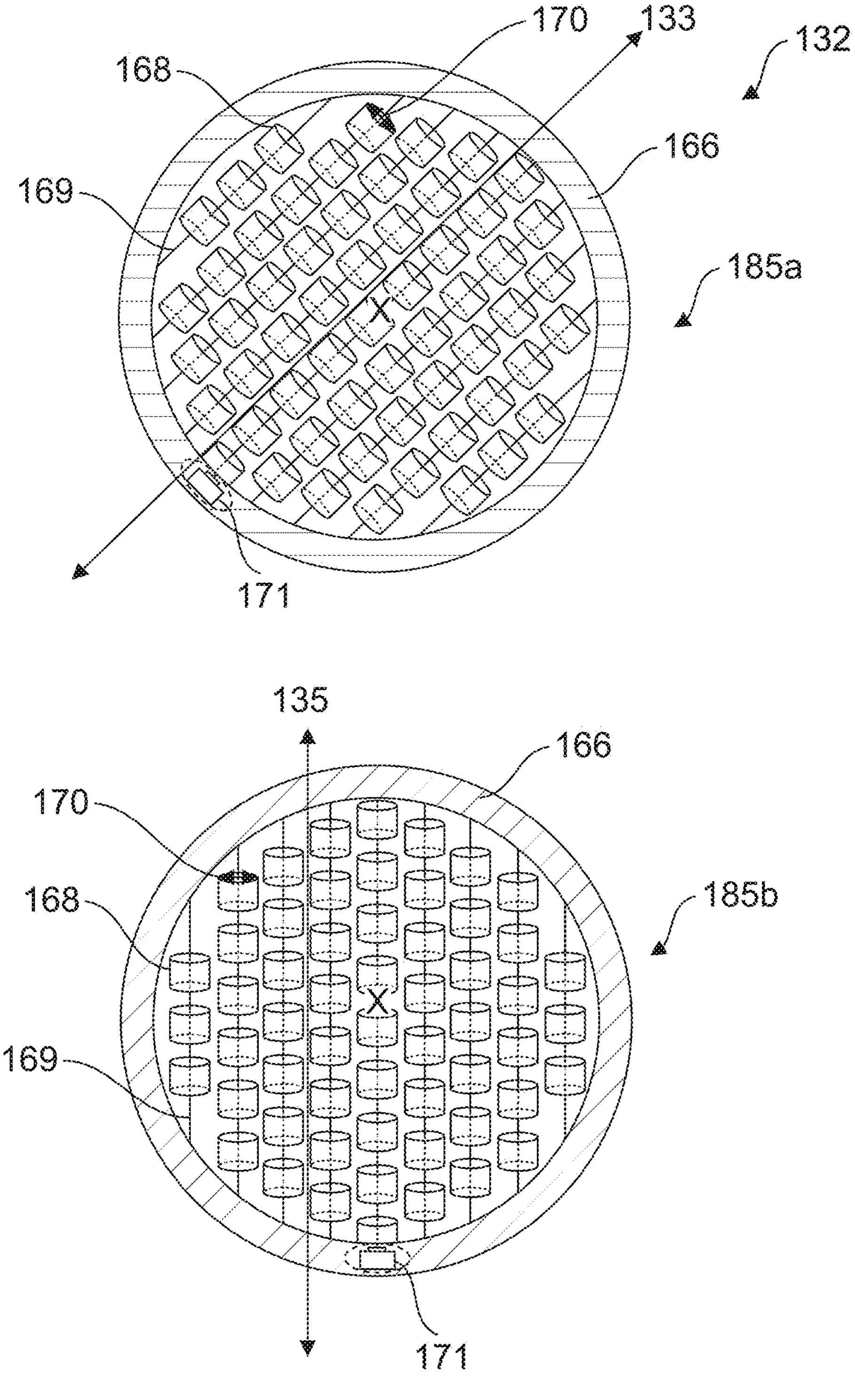
FIG. 10 shows levels of a sand crusher in accordance with one or more embodiments of the present disclosure.

The plurality of crushing elements 168 is disposed within the casing 166 of the sand crusher 132. In one or more embodiments, the plurality of crushing elements 168 is a set of grinding balls (e.g., FIGS. 5A-5C). However, the plurality of crushing elements 168 may be of another form of crushing elements 168 commonly known in the art, such as a set or a plurality of sets of grinding cylinders (e.g., as shown in FIG. 10). A set of grinding cylinders may be formed of a number of cylinders of different lengths extending radially with respect to an axis of the housing 130. Each set of the plurality of sets of grinding cylinders may be oriented at differing angles or perpendicular to other sets of grinding cylinders. For example, as shown in FIG. 10, rounded crushing elements 168 are provided as cylinders extending along a plane perpendicular with respect to an axis X of the casing 166 of a sand crusher 132. The cylinders may have the same or different diameters 170. The rounded crushing elements 168 include a first set of cylinders (shown in the upper level **185*a* in FIG. 10) oriented at a differing angle or perpendicular to a second set of cylinders (shown in the lower level 185*b* in FIG. 10). In the embodiment shown, the first set of cylinders are mounted on rods 169 extending across the width of the casing 166 in a first direction (parallel with arrow 133), and the second set of cylinders are mounted on rods 169 extending across the width of the casing 166 in a second direction (parallel with arrow 135), where the first direction is at an angle to the second direction. A rod motor 171 may be attached to the rods 169 in order to control and regulate the rotation of the rods 169**.

The plurality of crushing elements 168 are contained within a sand crusher 132 by a plurality of rods 169 as seen in FIG. 4. The plurality of rods 169 serve to position the plurality of crushing elements 168 within the casing 166 of a sand crusher 132. In one or more embodiments, and as seen in FIG. 4, the plurality of rods 169 may be embodied as a number of evenly spaced rods 169 of different lengths extending across the width of the casing 166 in a direction radial to the axis of the housing 130. To this end, the plurality of crushing elements 168 are disposed along the plurality of rods 169 such that the movement of the plurality of crushing elements 168 is limited and/or regulated by the plurality of rods 169.

Each rod 169 of the plurality of rods 169 may have a similar diameter which is less than the diameter 170 of the plurality of crushing elements 168. In one or more embodiments, each crushing element 168 of the plurality of crushing elements 168 may include a bore (not shown) such that a rod 169 of the plurality of rods 169 may extend through the crushing element 168. In one or more embodiments, the bore may have a diameter substantially similar to the diameter of the rod 169 such that the crushing element 168 is fixed in an axial direction along the rod 169 by a friction force. However, one of ordinary skill in the art will appreciate that a crushing element 168 may be fixed along a rod 169 by any known connection means (e.g., welding, glue, seal, rod-fixing clamps, etc.). Alternatively, a rod 169 having a plurality of crushing elements 168 may be manufactured as a single component. In any regard, the plurality of crushing elements 168 may be fixed along the plurality of rods 169 such that the plurality of crushing elements 168 are evenly spaced from one another.

The plurality of rods 169 and/or the plurality of crushing elements 168 may be formed of a strong and durable material such as bonded polycrystalline diamond (PDC), tungsten carbide, or steel. Further, in one or more embodiments, each crushing element 168 of the plurality of crushing elements 168 along a rod 169 may have a diameter 170 of the same size. For example, in the non-limiting example of FIG. 4, the diameter 170 of each crushing element 168 of the plurality of crushing elements 168 is 2 cm. A person of ordinary skill in the art will appreciate that the size of the crushing elements 168 and the spacing of the rods 169 and crushing elements 168 may be selected and/or varied based on the various design parameters including, for example, the type of fluid flow through the sand crusher 132, and the designed size of sand particles exiting the sand crusher 132.

In one or more embodiments, the plurality of crushing elements 168 are rotatable along the plurality of rods 169, while the plurality of rods 169 are rotatably fixed. In this case, rotation of the plurality of crushing elements 168 may be driven by fluid 112 flowing through the sand crusher 132. In one or more embodiments, the plurality of crushing elements 168 are rotatably fixed along the plurality of rods 169, while the plurality of rods 169 are rotatable. In this way, the plurality of crushing elements 168 only rotate as the plurality of rods 169 are rotated. Rotation of the plurality of rods 169 may be driven by fluid 112 flowing through the sand crusher 132. Alternatively, in one or more embodiments, a rod motor 171 may be attached to each rod 169 of the plurality of rods 169 to control and regulate the rotation of the plurality of rods 169. As depicted in FIG. 4, one end of each rod 169 of the plurality rods 169 may be attached to a rod motor 171 disposed within the walls of the casing 166. In one or more embodiments, the rod motors 171 attached to the plurality of rods 169 may alternatively be fixed to the interior of the casing 166. Further, in one or more embodiments, one or both ends of each rod 169 of the plurality of rods 169 may pass through a bearing (not shown) fixed within the walls of the casing 166.

In one or more embodiments, each rod motor 171 is an electric motor. Each rod motor 171 may be a DC motor or an AC motor, such as a servo motor. In one or more embodiments, the rod motors 171 may be in electric communication with the electric cable 146. Alternatively, in one or more embodiments, each rod motor 171 may include a battery (not shown) and a receiver (not shown) enabling the rod motor 171 to be controlled remotely.

The rod motors 171 may be actuated remotely by an operator at the surface location 110 in order to rotate the plurality of rods 169, and thus the plurality of crushing elements 168. In addition, the rod motors 171 may be actuated by a processing device located at the surface location 110 subsequent to the processing device receiving and/or analyzing data acquired by the sensor module 134. In particular, the processing device may actuate the rod motors 171 subsequent to determining the presence of sand particles within the fluid 112. In one or more embodiments, the sensor module 134 itself may actuate the rod motors 171 upon detection of sand particles within the fluid 112. Further, in one or more embodiments, each rod motor 171 may be actuated and controlled (e.g., speed of rotation, direction of rotation, etc.) independently from other rod motors 171.

Accordingly, as the plurality of crushing elements 168 are rotated, sand particles disposed within the fluid 112 having a size larger than a specified diameter (e.g., the largest distance between two neighboring crushing elements 168) are crushed and broken by the plurality of crushing elements 168. The operational sequence of a sand crusher 132 is further described with reference to FIGS. 5A-5C.

Figure 5C:
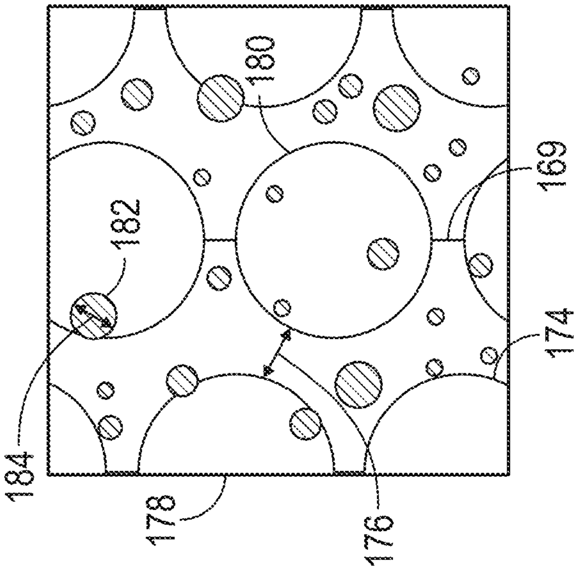
FIGS. 5A-5C depict the operational sequence of a sand crusher in accordance with one or more embodiments.
Figure 5B:
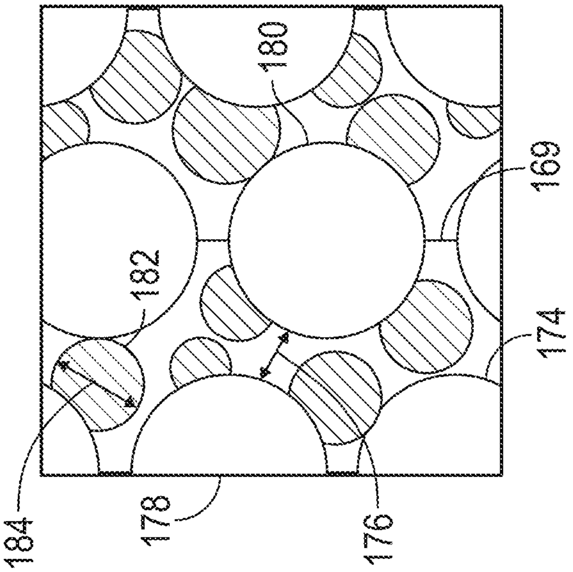
Figure 5A:
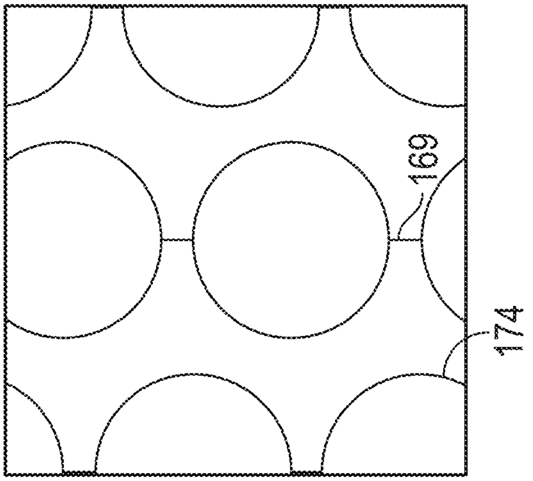

FIGS. 5A-5C depict the operational sequence of a sand crusher 132 in accordance with one or more embodiments. Specifically, FIGS. 5A-5C depict a closeup view of an interior of a sand crusher 132 as seen from a top-down perspective. In FIG. 5A, a fluid 112 not containing sand particles (e.g., FIG. 5B) is flowing through the sand crusher 132. Accordingly, because sand particles have not been detected within the fluid 112 flowing through the sand crusher 132, the plurality of rods 169 are not rotated by the rod motors 171, and thus, the plurality of crushing elements 168 remain stationary. Here, the plurality of crushing elements 168 are embodied as grinding balls 174.

In FIG. 5B, fluid 112 containing sand particles 182 has entered the downhole end of the sand crusher 132. The fluid 112 may have been lifted by the natural flow of the well 100 or pumped by artificial lifting equipment (e.g., the pump 162) from the downhole end of the well 100 into the sand prevention system 128, and thus, the sand crusher 132. In the example of FIG. 5B, the sand particles 182 within the sand crusher 132 vary in size 184. Typically, the size 184 of sand particles 182 range from 0.06 mm to 2 mm in diameter. However, larger or smaller sand particles 182 may enter the sand crusher 132 with the fluid 112.

At the period of time depicted in FIG. 5B, the sand particles 182 are downhole of the plurality of crushing elements 168. In addition, a majority of the sand particles 182 depicted in FIG. 5B include a size 184 greater than the specified diameter. In FIG. 5B, the specified diameter is the distance between a first grinding ball 178 and a second grinding ball 180. In one or more embodiments, the plurality of grinding balls 174 and the plurality of rods 169 are arranged within the casing 166 of the sand crusher 132 such that specified diameter is less than 0.1 mm. Since the majority of sand particles 182 seen in FIG. 5B have a size 184 greater than the specified diameter, the sand particles 182 are unable to pass beyond the plurality of grinding balls 174 within the sand crusher 132 until the size 184 of the sand particles 182 are reduced to be less than the specified diameter.

Subsequent to the sand particles 182 entering the downhole end of the sand prevention system 128, the sensor module 134 detects the presence of the sand particles 182.

Consequently, the plurality of rods 169 are rotationally actuated, and thus, begin to rotate the plurality of grinding balls 174 in order to crush sand particles 182 flowing through the sand crusher 132. To this end, the plurality of grinding balls 174 reduce the size 184 of the sand particles 182 to a size 184 less than or equal to the specified diameter.

In FIG. 5C, the rod motors 171 rotate the plurality of rods 169, and thus, the plurality of grinding balls 174, within the sand crusher 132. Accordingly, the sand particles 182 are lifted by the fluid 112 to come into contact with the plurality of grinding balls 174. Consequently, any sand particles 182 having a size 184 greater than the specified diameter that are driven into the spacing 176 of the first grinding ball 178 and the second grinding ball 180 are crushed between the first grinding ball 178 and the second grinding ball 180 as the first grinding ball 178 and the second grinding ball 180 rotate. As a result of the crushing force, the sand particles 182 previously disposed within the spacing 176 between the first grinding ball 178 and the second grinding ball 180 have broken into several different pieces, each with a size 184 less than or equal to the current spacing 176 between the first grinding ball 178 and second grinding ball 180 as seen in FIG. 5C.

While the sensor module 134 continues to detect sand particles 182 within the fluid 112 as the fluid 112 continues to flow through the sand crusher 132, sand particles 182 are continually crushed and broken into several smaller particles 182 until the sand particles 182 within the fluid 112 is a fine powder (e.g., having a size 184 less than 0.1 mm) and can pass through the set of grinding balls 174 and exit the sand crusher 132 through the uphole end of the sand crusher 132. Subsequent to exiting the sand crusher 132, the fluid 112 may carry the crushed sand particles 182 through the conduit 136 of the housing 130 to another sand crusher 132. This uphole sand crusher 132 acts as another line of defense in breaking down the sand particles 182 even further or breaking down sand particles 182 that may have exited the previous sand crusher 132 prior to being crushed to a fine powder. The grinding balls 174 within the uphole sand crusher 132 may include grinding balls 174 with smaller diameters than the downhole sand crusher 132 of FIGS. 5A-5C in order to reduce the spacing 176 between grinding balls 174, and therefore, further reduce the size 184 of the sand particles 182 within the fluid 112.

Figure 6:
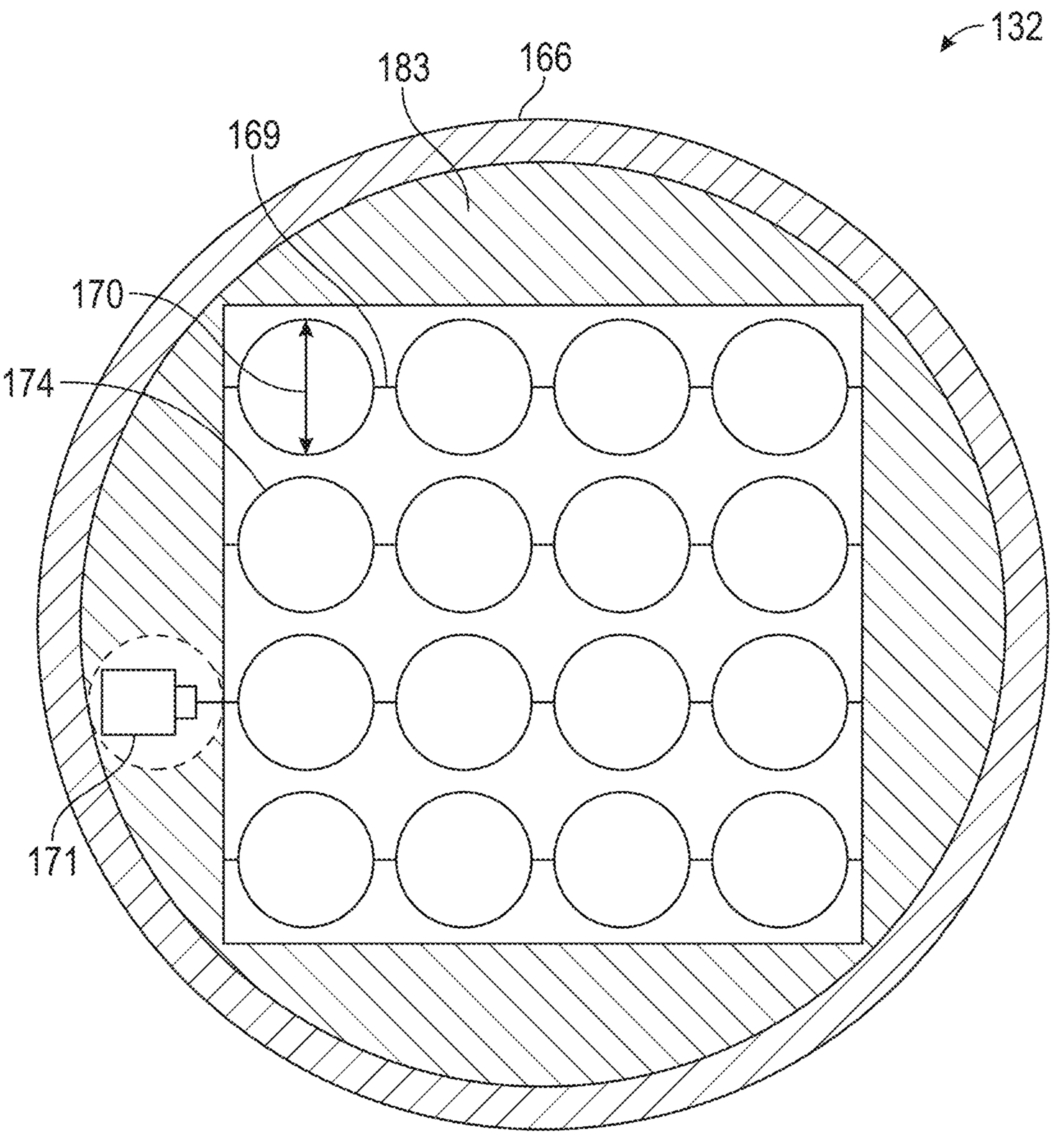
FIG. 6 shows a cross-sectional view of a sand crusher in accordance with one or more embodiments of the present disclosure.

FIG. 6 depicts an additional embodiment of a sand crusher 132. In this embodiment, a frame 183 is included within the interior of the sand crusher 132 of FIG. 6. The frame 183 extends from the interior wall of the casing 166 into the interior of the sand crusher 132 in order to shape the space through which the fluid 112 may flow through the sand crusher 132. Here, in FIG. 6, the frame 183 creates a square-shaped space within the interior of the sand crusher 132 that fluid 112 is permitted to flow through. However, the cross-sectional shape of formed by the frame 183 may vary in other embodiments (e.g., rectangular, hexagonal, etc.).

The frame 183 may be formed of a material that is durable and/or designed to withstand downhole temperatures and pressures such as steel or fiberglass. The frame 183 may be fixed to the interior wall of the casing 166 by any connection means commonly known in the art (e.g., welding, brazing, a threaded connection, etc.). Alternatively, the frame 183 may be formed integral with the casing 166.

In the embodiment depicted in FIG. 6, the plurality of rods 169 extend between the space created by the frame 183. As such, because the space created by the frame 183 is square shaped in this non-limiting example, each rod 169 of the plurality of rods 169 has a same length. In addition, each rod motor 171 may be disposed within the interior of the frame 183, rather than the interior of the casing 166, as depicted in FIG. 6.

Figure 7:
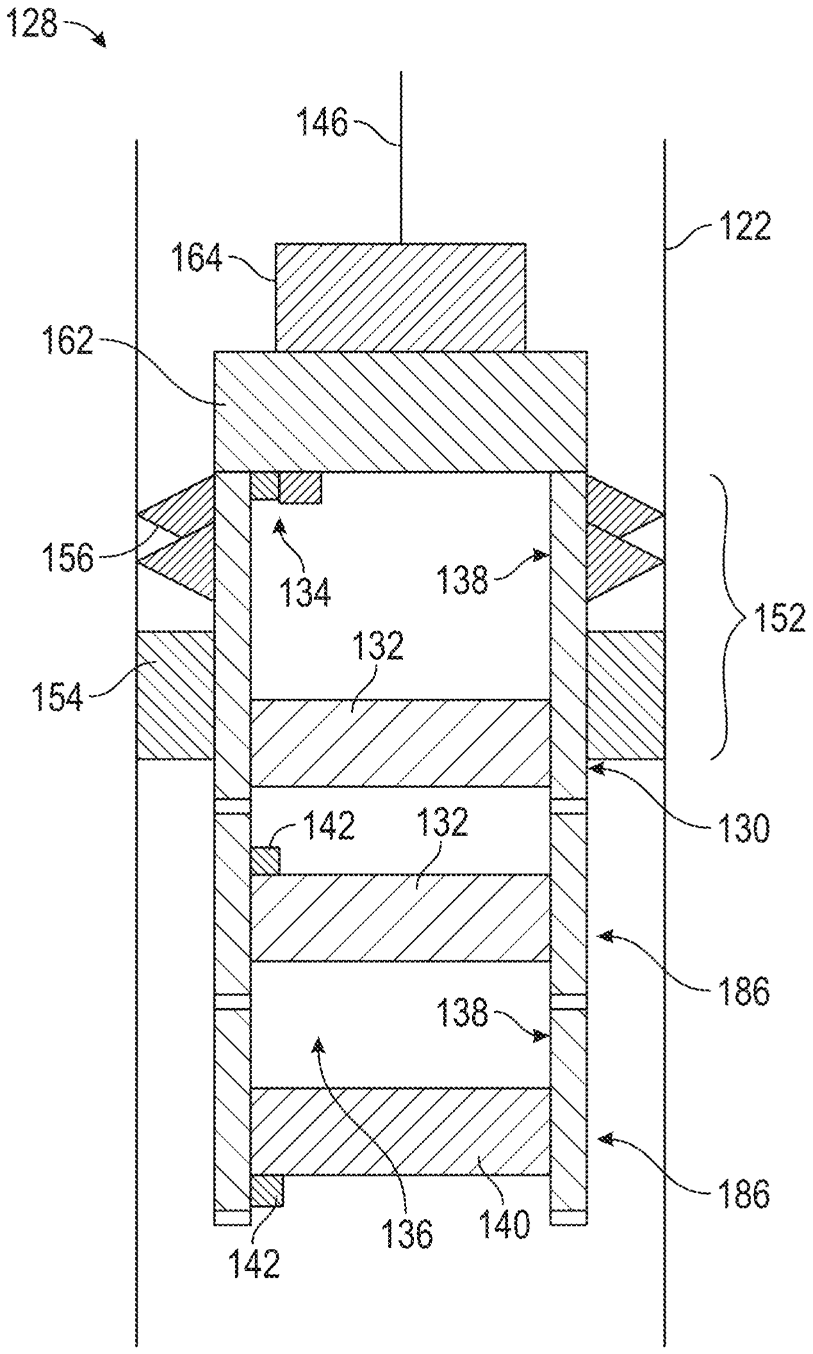
FIG. 7 shows a cross-sectional view of a sand prevention system in accordance with one or more embodiments of the present disclosure.

FIG. 7 depicts an additional embodiment of a sand prevention system 128. In this embodiment, the sand prevention system 128 includes a plurality of removable housing units 186. Specifically, an uphole end of a removable housing unit 186 is coupled to the downhole end of the housing 130, and a downhole end of the removable housing unit 186 is coupled to an uphole end of an additional removable housing unit 186. Similar to the housing 130, each removable housing unit 186 of the plurality of removable housing units 186 is tubular shaped, includes a conduit 136, and is formed of a durable material, such as steel. Each removable housing unit 186 includes an internal and external diameter similar to the internal and exterior diameters of the housing 130, respectively. Further, the uphole end of each removable housing unit 186 includes a threaded connection (not shown) that couples with a complementary threaded connection (not shown) disposed at the downhole end of the housing 130. In addition, the threaded connection of each removable housing unit 186 may couple to a complementary threaded connection (not shown) disposed at the downhole end of each removable housing unit 186. In the non-limiting example of FIG. 7, two removable housing units 186 are coupled to the housing 130 of the sand prevention system 128. However, further additional removable housing units 186 may be coupled together and coupled to the housing 130 of the sand prevention system 128 depending on the amount and size 184 of sand particles 182 entrained within the fluid 112 of the well 100.

In this embodiment, the housing 130 includes a sand crusher 132 and a sensor module 134 fixed to the interior wall 138 of the housing 130. A pump 162 and a motor 164, similar to the pump 162 and motor 164 described above, are coupled to an uphole end of the housing 130. The housing 130 may include a packer 154 and/or slips 156, as described above, for sealing and securing the housing 130 to the production tubing 122. In addition, each removable housing unit 186 may include a sand crusher 132 or a sand screen 140 coupled to an interior wall 138 of the removable housing unit 186. Further, each removable housing unit 186 may include a sensor module 134 or a sensor 142. The sand crushers 132 of each removable housing units 186 may differ from sand crushers 132 of other removable housing units 186. That is, the plurality of crushing elements 168 may vary for the sand crusher 132 of each removable housing unit 186. Furthermore, the diameters of the plurality of crushing elements 168 may vary for the sand crusher 132 of each removable housing unit 186.

Figure 8:
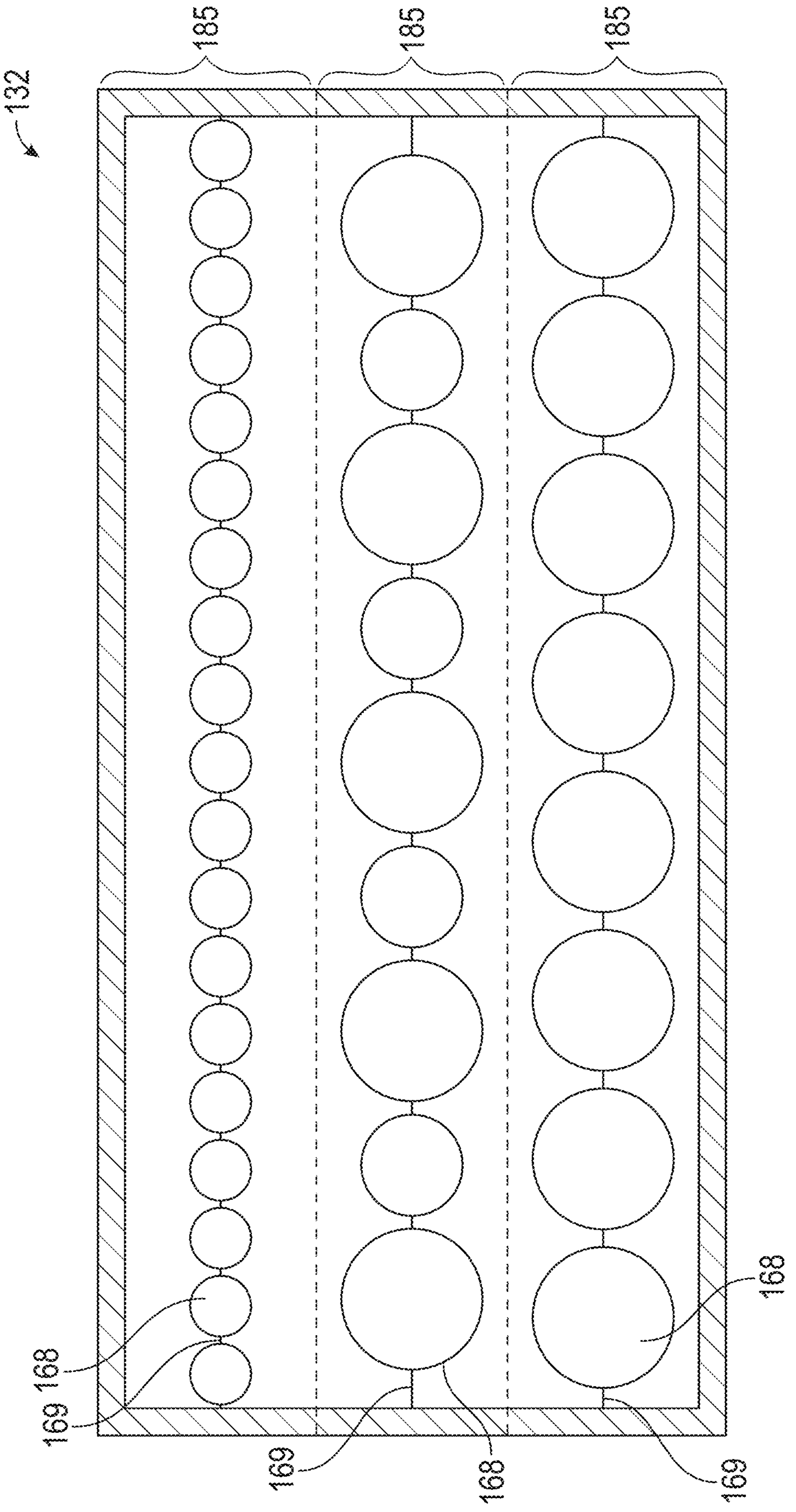
FIG. 8 shows a cross-sectional view of a sand crusher in accordance with one or more embodiments of the present disclosure.

FIG. 8 depicts an additional embodiment of a sand crusher 132. In particular, FIG. 8 depicts a cross-sectional view of an additional embodiment of a sand crusher 132 from a side perspective. In this embodiment, the sand crusher 132 includes a plurality of vertically stacked levels 185. Each level 185 of the sand crusher 132 includes a set of a plurality of rods 169 with attached crushing elements 168 as described above in FIGS. 4-6. In one or more embodiments, each level 185 of the sand crusher 132 may be identical. For example, each level 185 may include the same number of rods 169, the same number of crushing elements 168 attached to each rod 169, the same type crushing elements 168, the same size of crushing elements 168, etc. In this way, each level 185 uphole of the first level 185 of the sand crusher 132 may act as a redundancy in the case that sand particles 182 exited the previous level 185 prior to being crushed to a fine powder.

Alternatively, in one or more embodiments, each level 185 of the sand crusher 132 may be unique. For example, each level 185 may differ in the number of rods 169, the rotation direction of the rods 169, the rotation speed of the rods 169, the number of crushing elements 168 attached to each rod 169, the type of crushing elements 168, the size of crushing elements 168, the spacing 176 between crushing elements 168, etc. In the non-limiting example of FIG. 8, the lower-most level 185 of the sand crusher 132 includes a plurality of crushing elements 168 having a diameter 170 of 4 cm, the middle level 185 of the sand crusher 132 includes a plurality of crushing elements 168 having diameters ranging from 3-4 cm, and the upper-most level 185 of the sand crusher 132 includes a plurality of crushing elements 168 having a diameter 170 of 2 cm. In this way, each level 185 of the sand crusher 132 acts as an independent line of defense in breaking down the sand particles 182 until the sand particles 182 have a size 184 less than or equal to the specified diameter.

Further, the sand crusher 132 may be manufactured to include a plurality of levels 185 that are predetermined. However, in one or more embodiments, each level 185 of a sand crusher 132 may be removable and interchangeable such that a sand crusher 132 may be designed to reduce sand particles 182 according to the different needs of differing wells. To this end, a casing 166 of each level 185 of the sand crusher 132 may include a threaded connection at an uphole end of the casing 166 and a complementary threaded connection at a downhole end of the casing 166. As such, the threaded connection at the uphole end of each level 185 may couple with a complementary threaded connection disposed at the downhole end of an additional level 185 of the sand crusher 132. In the non-limiting example of FIG. 8, the sand crusher 132 is depicted as having three removable levels 185. However, the sand crusher 132 may employ more or less levels 185 depending on the amount and size 184 of sand particles 182 entrained within the fluid 112 of the well 100.

Figure 9:
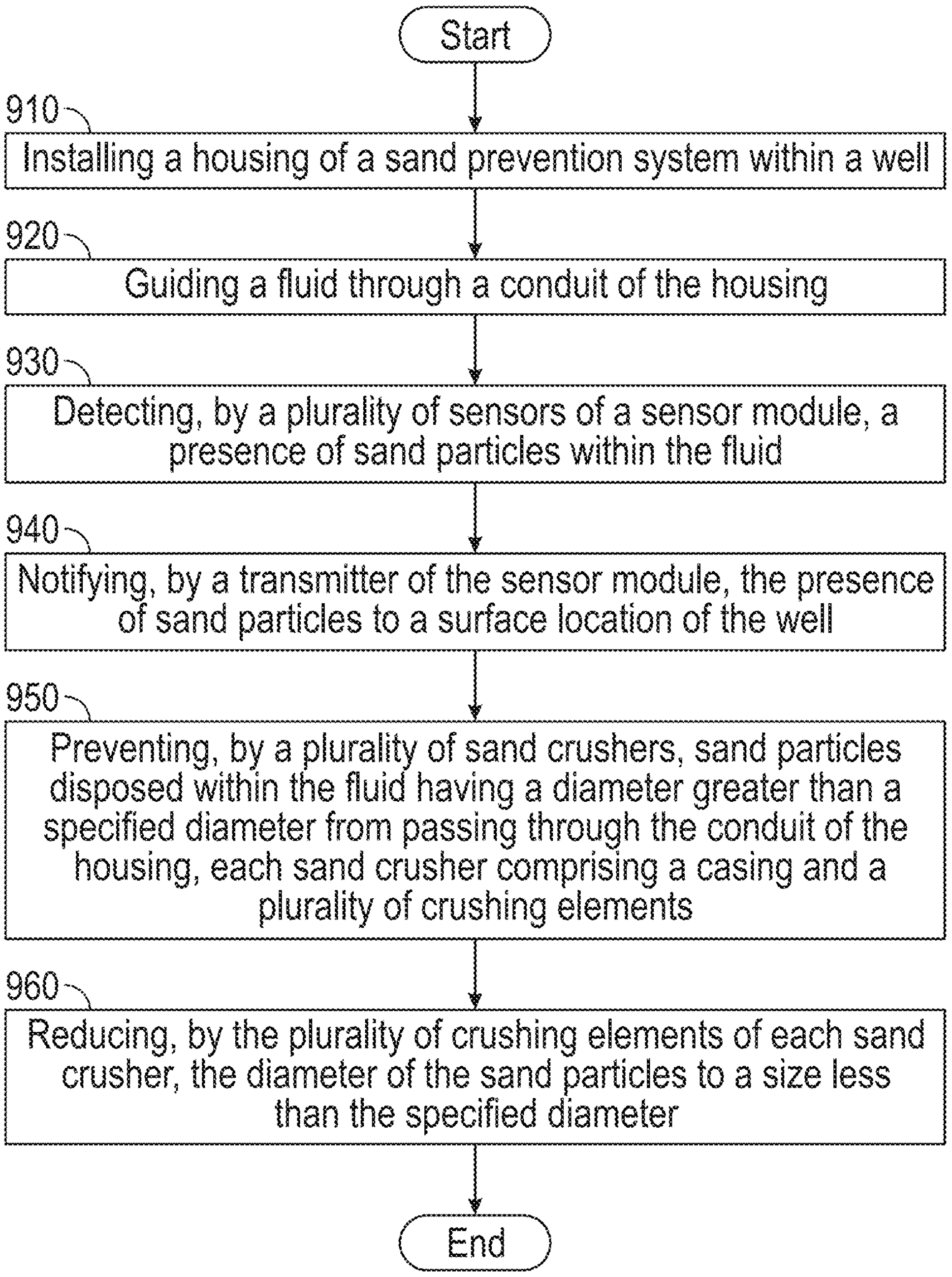
FIG. 9 shows a flowchart of a method in accordance with one or more embodiments of the present disclosure.

FIG. 9 depicts a flowchart showing a method for reducing the size 184 of sand and/or other solid particles 182 and preventing damage to production and surface equipment of a well 100. While the various flowchart blocks in FIG. 9 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In block 910, the housing 130 of a sand prevention system 128 is installed within a well 100. The housing 130 is secured within the well 100 by a locking unit 152. In one or more embodiments, the locking unit 152 may secure the housing 130 within production tubing 122 of the well 100 subsequent to the housing 130 being deployed within the production tubing 122 by rigless intervention. Upon reaching the desired setting depth, the locking unit 152, formed of a packer 154 and/or slips 156, is actuated to isolate and anchor the housing 130 within the production tubing 122. Alternatively, the locking unit 152 may include a set of locking dogs (not shown) and the production tubing 122 may include seating nipples (not shown) at the desired setting depth of the housing 130. Accordingly, when the housing 130 has been lowered to the desired setting depth, the locks of the locking dogs of the locking unit 152 will actuate, land, and lock within the corresponding seating nipples of the production tubing 122.

In one or more embodiments, the locking unit 152 may be a threaded connection (not shown) disposed along the uphole end of the housing 130 that couples to a complementary threaded connection (not shown) of a tubular of the production tubing 122. In this way, the housing 130 of the sand prevention system 128 may be threadedly secured to a downhole end of a tubular of the production tubing 122.

Further, in one or more embodiments, the housing 130 of the sand prevention system 128 may be installed at the surface location 110 between the production tree 102 and the casing head 108. Here, the locking unit 152 may be threaded connections (not shown) disposed along the uphole and downhole ends of the housing 130 which couple to complementary threaded connections (not shown) of the production tree 102, tubing bonnet 104, tubing head 106, and/or casing head 108.

In one or more embodiments, the locking unit 152 may be steel flanges (not shown) extending radially with respect to an axis of the housing 130 from the uphole and downhole ends of the housing 130. The flanges of the locking unit 152 are complementary to complementary flanges 158 of the surface equipment of the well 100. Further, the locking unit 152 may further include bolts (not shown) to secure the flanges to complementary flanges 158 of the production tree 102, tubing bonnet 104, tubing head 106, and/or casing head 108. In each embodiment, the sand prevention system 128 is installed downhole from the master valve 160 of the well 100.

In block 920, the fluid 112 is guided through the conduit 136 of the housing 130. That is, the fluid 112 of the well 100 is lifted from the downhole end of the well 100, into the downhole end of the production tubing 122, and then into the entrance of the conduit 136 of the housing 130. The fluid 112 may be lifted by the natural flow of the well 100 or by artificial lifting equipment, such as a pump 162 of the sand prevention system 128. The pump 162 may be coupled to the uphole end of the housing 130 or disposed a distance uphole of the housing 130 within the production tubing 122. Subsequent to entering the conduit 136 of the housing 130, the fluid 112 travels through the plurality of sand crushers 132 and the sand screen 140 of the sand prevention system 128. Then, the fluid 112 exits the housing 130 of the sand prevention system 128 and travels towards the surface location 110 to be produced. In one or more embodiments, subsequent to exiting the housing 130, the fluid 112 enters the pump intake of the pump 162 and is vented by the pump discharge back into the production tubing 122. Upon exiting the pump discharge of the pump 162, the fluid 112 travels to the surface location 110.

In block 930, the plurality of sensors 142 of the sensor module 134 detects the presence of sand particles 182 entrained within the fluid 112 traveling through the conduit 136 of the housing 130. The plurality of sensors 142 may be a form of electrical resistance sensors 142 and positioned along the interior wall 138 of the housing 130 before and/or after each sand crusher 132 and sand screen 140 within the housing 130. In this way, the plurality of sensors 142 may collect data regarding the sand particles 182 and the sand prevention system 128. The data collected by the plurality of sensors 142 may include the presence of sand particles 182 within the fluid 112, the amount and size 184 of sand particles 182 that have entered the conduit 136 of the housing 130, the amount and size 184 of sand particles 182 that have exited the conduit 136 of the housing 130, and/or the amount/percentage of sand particles 182 that have been crushed by the sand crushers 132 of the sand prevention system 128. The data may be collected before the fluid 112 enters a sand screen 140 or a sand crusher 132, after the fluid 112 exits the sand screen 140 but before it enters the sand crusher 132, and/or after it exits one or more sand crushers 132. Accordingly, the sensor module 134 may process the data collected by the plurality of sensors 142. Alternatively, the data may be processed by processing devices (not shown) disposed at the surface location 110 subsequent to process of block 940.

In block 940, the transmitter 144 of the sensor module 134 sends a signal to the surface location 110 of the well 100 notifying the presence of sand particles 182 in the fluid 112. In addition, the transmitter 144 may send a signal to the surface location 110 in the case that no sand particles 182 were detected in the fluid 112 by the plurality of sensors 142.

The data collected by the plurality of sensors 142 may be sent to the surface location 110 by the transmitter 144 wirelessly. However, in one or more embodiments, the sensor module 134 may be in electrical communication with an electric cable 146 that is connected to the sand prevention system 128 and extends to the surface location 110. In this way, the transmitter 144 of the sensor module 134 may send the data to the surface location 110 through the electric cable 146.

In block 950, in the case that sand particles 182 are present within the fluid 112 passing through the conduit 136 of the sand prevention system 128, sand particles 182 with a size 184 greater than a specified diameter are prevented from passing through the entirety of the conduit 136 by the plurality of sand crushers 132. Each sand crusher 132 includes a casing 166 and a plurality of crushing elements 168. The plurality of crushing elements 168 are contained within a sand crusher 132 by a plurality of rods 169. In particular, the plurality of crushing elements 168 are disposed along the plurality of rods 169 such that the movement of the plurality of crushing elements 168 is limited and/or regulated by the plurality of rods 169.

In one or more embodiments, the plurality of crushing elements 168 are rotatably fixed along the plurality of rods 169, while the plurality of rods 169 are rotatable about their axis of extension. In this way, the plurality of crushing elements 168 only rotate as the plurality of rods 169 are rotated. The rotation of the plurality of rods 169 may be driven by fluid 112 flowing through the sand crusher 132. In one or more embodiments, a rod motor 171 may be attached to each rod 169 of the plurality of rods 169 in order to control and regulate the rotation of the plurality of rods 169. In addition, in one or more embodiments, the plurality of crushing elements 168 are rotatable along the plurality of rods 169, while the plurality of rods 169 are rotatably fixed. In this case, rotation of the plurality of crushing elements 168 may be driven by fluid 112 flowing through the sand crusher 132.

In one or more embodiments, the plurality of crushing elements 168 are steel grinding balls 174. Each grinding ball 174 disposed along a rod 169 may have a same diameter 170. Alternatively, in one or more embodiments, the diameter 170 of each grinding ball 174 along a rod 169 may vary (e.g., ranging from 2 cm to 5 cm).

Further, in one or more embodiments, a sand screen 140 may be disposed downhole from the plurality of sand crushers 132 in order to filter and prevent the largest sand and/or other solid particles 182 from entering the conduit 136 of the housing 130 and/or a sand crusher 132.

In block 960, the plurality of crushing elements 168 reduces the size 184 of the sand particles 182 to a size 184 less or equal to the specified diameter. The specified diameter is determined as the largest distance between two neighboring crushing elements 168. Specifically, in one or more embodiments, as the fluid 112 enters a sand crusher 132, the crushing elements 168 are rotated either due to the fluid 112 or by way of the rod motors 171 in order to crush any sand particles 182 that happen to be within the fluid 112 and have a size 184 greater than the specified diameter. Alternatively, in order to conserve energy, the rod motors 171 may only be actuated subsequent to the sand particles 182 being detected within the fluid 112 by the sensor module 134. Thus, upon detection of sand particles 182 within the fluid 112, the plurality of crushing elements 168 are rotated by the plurality of rods 169 and the rod motors 171 in order to reduce the size 184 of the sand particles 182 to a size 184 less than or equal to the specified diameter.

In one or more embodiments, upon exiting one sand crusher 132, the broken sand particles 182 may be carried by the fluid 112 through another sand crusher 132, such that the size 184 of the broken sand particles 182 are further reduced. In one or more embodiments, each sand crusher 132 of the plurality of sand crushers 132 may contain a plurality of levels 185 where each level 185 acts an independent line of defense in breaking down the sand particles 182. In one or more embodiments, rotation of the plurality of rods 169 via the rod motors 171 may be ceased subsequent to the sensor module 134 no longer detecting sand particles 182 in the fluid 112 entering the downhole end of the sand prevention system 128.

By crushing and breaking sand particles 182 into smaller sand particles 182, the weight of individual sand particles 182 is reduced. As a result, upon exiting the sand prevention system 128, the reduced weight of the crushed sand particles 182 significantly decreases the force of collision between the sand particles 182 and the production and surface equipment of the well 100. In this way, damage caused by sand production to the production and surface equipment of the well 100 is significantly reduced.

Subsequent to exiting the sand prevention system 128, the sand particles 182 within the fluid 112 will have a size 184 of a fine powder (e.g., a diameter less than 0.1 mm). The fluid 112, and thus the crushed sand particles 182, then travel to the surface location 110 in order for the fluid 112 to be produced. At the surface location 110, fluid 112 may be further filtered to remove the crushed sand particles 182.

Accordingly, the aforementioned embodiments as disclosed relate to systems 128 and methods useful for reducing the size 184 of sand and/or other solid particles and preventing damage to production and surface equipment of a well 100. The aforementioned embodiments may reduce the weight of individual sand particles 182, and in turn reduce the force of collision between the sand particles 182 and the production and surface equipment. Further, the aforementioned embodiments may advantageously be installed permanently within the well 100. In addition, the disclosed systems 128 and methods useful for preventing damage to production and surface equipment of a well 100 advantageously reduce additional rig time and associated costs.

Although only a few embodiments of the invention have been described in detail above, those skilled in the art will readily appreciate that many modifications are possible in the example embodiments without materially departing from this invention. Accordingly, all such modifications are intended to be included within the scope of this disclosure as defined in the following claims. In addition, those skilled in the art will readily appreciate that the sand prevention system 128 may reduce the size 184 of solid particles other than sand particles 182. In the claims, means-plus-function clauses are intended to cover the structures described herein as performing the recited function and not only structural equivalents, but also equivalent structures.

What is claimed is:

1. A sand prevention system, comprising:

a housing comprising a conduit;

a sand crusher coupled to the housing, the sand crusher comprising:

a casing; and a plurality of rounded elements mounted on rods, wherein the rods are each connected to the casing, such that the plurality of rounded elements are housed within the casing;

wherein the plurality of rounded elements are spaced apart from each other, such that sand particles, disposed within a fluid of a well, with a diameter greater than a spacing between the rounded elements are prevented from passing through the sand crusher; and a sensor module fixed within the housing, the sensor module comprising:

a plurality of sensors configured to detect a presence of sand particles within the fluid; and a transmitter configured to notify a surface location of the well of the presence of the sand particles within the fluid.

2. The sand prevention system according to claim 1, wherein at least one of the rods is rotatable and independently driven by a rod motor, such that the plurality of rounded elements are rotatably fixed on the at least one of the rods.

3. The sand prevention system according to claim 1, further comprising a sand screen coupled within the housing, the sand screen configured to filter sand particles from the fluid.

4. The sand prevention system according to claim 1, wherein the plurality of rounded elements each comprise a cylinder extending along a plane perpendicular with respect to an axis of the housing, and wherein the plurality of rounded elements comprises a first set of cylinders oriented at a differing angle or perpendicular to a second set of cylinders.

5. The sand prevention system according to claim 4, wherein at least one of the cylinders comprises a length different from at least another of the cylinders.

6. The sand prevention system according to claim 1, wherein the rods comprise differing lengths placed in an evenly spaced configuration.

7. The sand prevention system according to claim 1, wherein at least one of the rods is rotatably fixed and the plurality of rounded elements are rotatable on the at least one of the rods.

8. The sand prevention system according to claim 1, wherein the plurality of rounded elements are grinding balls having a same diameter.

9. The sand prevention system according to claim 1, wherein the housing is coupled to a production tubing of the well.

10. The sand prevention system according to claim 1, wherein the housing is provided in a surface wellhead assembly below a master valve.

11. The sand prevention system according to claim 1, further comprising a plurality of removable housing unit comprising:

a second conduit;

a second sand crusher or a sand screen; and the sensor module, wherein the removable housing unit is connected to the housing such that the conduit and second conduit are axially aligned.

12. The sand prevention system according to claim 11, wherein the sensor module is configured to collect and transmit data to the surface location of the well, the data comprising at least one of an amount of sand particles that has entered the conduit, an amount of sand particles that has exited the conduit, or a percentage of sand particles that has been crushed by the sand crusher.

13. A method, comprising:

installing a housing of a sand prevention system within a well;

guiding a fluid through a conduit of the housing;

detecting, by a plurality of sensors of a sensor module, a presence of sand particles within the fluid;

notifying, by a transmitter of the sensor module, the presence of sand particles to a surface location of the well;

preventing, by a sand crusher, sand particles disposed within the fluid having a diameter greater than a specified diameter from passing through the conduit of the housing, the sand crusher comprising a casing and a plurality of rounded elements mounted on rods, wherein the rods are each connected to the casing, such that the plurality of rounded elements are housed within the casing; and reducing, by the plurality of rounded elements of the sand crusher, the diameter of the sand particles to a size less than the specified diameter.

14. The method according to claim 13, further comprising rotating a at least one of the rods via a rod motor, to rotate the plurality of rounded elements.

15. The method according to claim 13, wherein reducing the diameter of the sand particles comprises crushing the sand particles via a plurality of cylinders extending along a plane perpendicular with respect to an axis of the housing, wherein the plurality of cylinders comprises a first set of cylinders oriented at a differing angle or perpendicular to a second set of cylinders.

16. The method according to claim 13, wherein the rods comprise differing lengths placed in an evenly spaced configuration.

17. The method according to claim 13, further comprising rotating the plurality of rounded elements on at least one of the rods, via the guided fluid flowing through the sand crusher, wherein the at least one of the rods is rotatably fixed.

18. The method according to claim 13, further comprising coupling a removable housing unit to the housing, the removable housing unit comprising:

a second conduit;

a second sand crusher or a sand screen; and the sensor module, wherein coupling the removable housing unit comprises axially aligning the conduit to the second conduit.

19. The method according to claim 13, wherein reducing, by the plurality of rounded elements of the sand crusher, the diameter of the sand particles comprises crushing the sand particles with a set of grinding balls.

20. The method according to claim 13, further comprising collecting data with the plurality of sensors of the sensor module, the data comprising at least one of an amount of sand particles that has entered the housing, an amount of sand particles that has exited the housing, or an amount of sand particles that has been crushed by the sand crusher.

* * * * *